(12) United States Patent
Kajitani

(10) Patent No.: US 7,011,295 B2
(45) Date of Patent: Mar. 14, 2006

(54) VACUUM REGULATING VALVE

(75) Inventor: Masao Kajitani, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/929,874

(22) Filed: Aug. 30, 2004

(65) Prior Publication Data

US 2005/0092960 A1    May 5, 2005

(30) Foreign Application Priority Data

Sep. 2, 2003    (JP)    ............................. 2003-310608

(51) Int. Cl.
*F16K 51/02*    (2006.01)
(52) U.S. Cl. .................... 251/335.3; 251/63.5
(58) Field of Classification Search .............. 251/63.5, 251/324, 335.1, 335.3
See application file for complete search history.

(56) References Cited

U.S. PATENT DOCUMENTS

| | | | | |
|---|---|---|---|---|
| 4,232,695 | A | * | 11/1980 | Roberge ........................ 137/1 |
| 4,482,091 | A | * | 11/1984 | Lawsing .................... 236/92 R |
| 6,045,115 | A | * | 4/2000 | Martin et al. ................ 251/118 |
| 2002/0000531 | A1 | * | 1/2002 | Osawa et al. ................ 251/203 |
| 2004/0011985 | A1 | * | 1/2004 | Osawa et al. ................ 251/158 |

FOREIGN PATENT DOCUMENTS

| | | |
|---|---|---|
| JP | 08-178126 | 7/1996 |
| JP | 09-133238 | 5/1997 |

* cited by examiner

*Primary Examiner*—J. Casimer Jacyna
(74) *Attorney, Agent, or Firm*—Hisako Muramatsu, Esq.

(57) ABSTRACT

A vacuum regulating valve is capable of precisely controlling the flow of a fluid so that the flow rate may increase gradually in an initial stage of a valve opening operation. The vacuum regulating valve includes a valve casing having a valve chamber and provided with a first opening connected to a vacuum vessel and a second opening connected to a vacuum pump, a valve seat, a valve element seated on the valve seat, a valve stem connected to the valve element, a bellows sealing the valve stem therein, and a baffle member attached to the back surface of the valve element and surrounding the bellows. The baffle member is formed in an axial length such that the baffle member is able to cover the second opening entirely when the valve element is seated on the valve seat. The outside diameter of the baffle member is determined such that an outside space of the smallest possible thickness is defined between the outer circumference of the baffle member and the inner circumference of the side wall of the valve casing, and the thickness of the outside space is great enough to keep the baffle member spaced from the inner circumference of the side wall of the valve casing and is small enough to prevent a fluid from flowing through the outside space into an inside space formed between the baffle member and an imaginary cylinder circumscribed about the bellows.

5 Claims, 4 Drawing Sheets

OPENING OF THE VALVE ELEMENT

VACUUM REGULATING VALVE

BACKGROUND OF THE INVENTION

1. Field of the Invention

The present invention relates to a vacuum regulating valve for regulating the pressure in an evacuated vacuum vessel for chemical reaction included in a physical or chemical machine or the like.

2. Description of the Related Art

A chemical process, such as an etching process, is carried out in a vacuum vessel included in a semiconductor device fabricating system. The vacuum vessel is evacuated at a negative pressure by a vacuum pump. A pressure regulating valve is placed in an external line connecting the vacuum vessel to the vacuum pump.

A pressure regulating valve disclosed in JP-A No. 8-178126 includes a valve casing having a valve chamber, provided with a first port having an axis parallel to the axis of the valve casing, a second port having an axis perpendicular to the axis of the valve casing, and a valve seat formed in an internal passage connecting the first and the second port; a disk-shaped valve element to be seated on the valve seat to close the pressure regulating valve; a valve operating unit for operating the valve element for opening and closing operations; a valve stem having one end connected to the valve element and the other end connected to the valve operating unit; and a bellows disposed behind the valve element so as to surround the valve stem in an air-tight fashion. One of the ports is connected to a vacuum vessel and the other is connected to a vacuum pump.

This prior art pressure regulating valve has a discharge characteristic indicated by a doted line in FIG. 5. In an initial stage of a valve opening operation, discharge rate increases sharply. Such a discharge characteristic may be due to the discharge of a fluid through a space around the valve element and a space between the bellows and the side wall of the valve casing upon the opening of the pressure regulating valve because the diameter of the valve element is comparatively small as compared with the inside diameter of the valve casing, and the space between the bellows and the side wall of the valve casing is wide. In most cases, it is desired to use a valve capable of discharging a fluid at a low discharge rate and of precisely controlling the discharge of the fluid in an initial stage of a valve opening operation because particles staying in a vacuum vessel and a passage connected to the vacuum vessel are liable to be stirred and raised and the control of the vacuum of the vacuum vessel is difficult if the vacuum vessel is evacuated rapidly.

It may be possible to discharge the fluid at a low discharge rate in the initial stage of the valve opening operation by using a bellows having a large outside diameter to narrow the space between the bellows and the side wall of the valve casing. However, the bellows extends and contracts according to the movement of the valve element, and the bellows vibrates when the same extends and contracts. Consequently, it is possible that the bellows wears rubbing against the side wall of the valve casing and produce dust. Therefore, a sufficiently wide space must be formed between the outer surface of the bellows and the side wall of the valve casing.

A valve disclosed in JP-A No. 9-133238 is provided with a cylindrical member, namely, a dust-adhesion preventing member, attached to a valve element and surrounding a bellows. This prior art valve has a valve casing provided with a first port having an axis parallel to the axis of the valve casing and connected to a vacuum pump, and a second port formed in the side wall of the valve casing and connected to a vacuum vessel. When the vacuum vessel is evacuated, the dust-adhesion preventing member prevents reaction products produced in the vacuum vessel and sucked through the second port into the valve from impinging on and sticking to the outer surface of the bellows. Therefore, the dust-adhesion preventing member is disposed nearer to the bellows than to the side surface of the valve casing to enhance the dust-adhesion preventing effect of the dust-adhesion preventing member. Consequently, a wide space is formed between the dust-adhesion preventing member and the side wall of the valve casing. Therefore, the valve does not have a function capable of preventing the flow of a fluid into the space between the dust-adhesion preventing member and the bellows when the vacuum vessel is evacuated. The diameter of a valve chamber formed in the valve casing and containing the bellows and the dust-adhesion preventing member is not uniform, and end part of the valve chamber is reduced. Therefore, the dust-adhesion member must be prevented from colliding against a wall defining the reduce part of the valve chamber at the end of the opening stroke of the valve element and hence the dust-adhesion preventing member needs to be spaced sufficiently apart from the side wall of the valve casing.

SUMMARY OF THE INVENTION

Accordingly, it is an object of the present invention to provide a vacuum regulating valve capable of gradually increasing and precisely controlling the flow rate of a fluid in an initial stage of opening.

A vacuum regulating valve according to the present invention includes: a valve casing having a cylindrical valve chamber extending along an axis, and provided with a first port having an axis parallel to the axis of the valve chamber and a first open end opening into the valve chamber, and a second port having an axis perpendicular to the axis of the valve chamber and a second open end opening into the valve chamber; a valve seat defining the first open end; a disk-shaped valve element capable of being seated on the valve seat to give a tight closure on the valve seat; a valve stem extending from a back part of the valve element coaxially with the valve chamber; a valve operating unit for operating the valve element through the valve stem for opening and closing operations; an extendable bellows disposed in the valve chamber so as to surround the valve stem in an airtight fashion; and a cylindrical baffle member disposed behind the valve element so as to surround the bellows and capable of moving together with the valve element; wherein the baffle member has a base part attached to the valve element and an open free end, and is formed in an axial length such that the baffle member is able to cover the second open end entirely when the valve element is seated on the valve seat; the outside diameter of the baffle member is determined such that an outside space of the smallest possible thickness is defined between the outer circumference of the baffle member and the inner circumference of the side wall of the valve casing, the thickness of the outside space is great enough to keep the baffle member spaced from the inner circumference of the side wall of the valve casing and is small enough to prevent a fluid from flowing through the outside space into an inside space formed between the baffle member and an imaginary cylinder circumscribed about the bellows; and the inside space has a thickness greater than that of the outside space.

In the vacuum regulating valve according to the present invention, the valve operating unit drives the valve stem so as to lift up the valve element from the valve seat to evacuate a vacuum vessel. Then, a fluid flows through either of the first and the second port into the valve chamber and flows outside through the gap between the valve element and the valve seat and the other port. Since the baffle member is disposed behind the valve element so as to surround the bellows and to extend close to the inner circumference of the side wall, the flow of the fluid through the outside space around the baffle member into the inside space around the bellows is impeded and hence the increase of the flow rate of the fluid is suppressed. Consequently, a large amount of the fluid is unable to flow through the inside space around the bellows and the fluid is unable to flow at a high flow rate through the gap between the lifted valve element and the valve seat when the opening of the vacuum regulating valve is increased. Thus the flow rate of the fluid increases gradually in the initial stage of a valve opening operation, and the flow rate of the fluid can be precisely controlled. Since the thickness of the inside space around the bellows is greater than that of the outside space around the baffle member, the bellows will not come into contact with the baffle member even if the bellows vibrates slightly when the same extends and contracts.

In the vacuum regulating valve according to the present invention, it is preferable that the first port is connected to the vacuum vessel, and the second port is connected to a vacuum pump. Such a manner of connecting the vacuum regulating valve to the vacuum vessel and the vacuum pump enhances the undesirable fluid flow impeding effect of the baffle member.

In the vacuum regulating valve according to the present invention, the base part of the baffle member has an annular bottom wall, and the bottom wall is fastened to the back surface of the valve element to attach the baffle member to the valve element.

In the vacuum regulating valve according to the present invention, it is preferable that the disk-shaped valve element has a diameter substantially equal to the outside diameter of the baffle member.

In the vacuum regulating valve according to the present invention, the baffle member may be provided in its side wall with an axial slit.

Since the flow of the fluid into the inside space around the bellows can be impeded by the cylindrical baffle member disposed behind the valve element so as to extend close to the inner circumference of the side wall of the valve casing and so as to surround the bellows to control the flow of the fluid, the sharp increase of the flow rate of the fluid in the initial stage of the valve opening operation can be prevented, the flow rate increases gradually, and the precise control of the flow rate can be achieved.

Since the thickness of the inside space between the baffle member and the bellows is greater than that of the outside space, the bellows will not come into contact with the baffle member even if the bellows vibrates slightly when the same extends and contracts.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
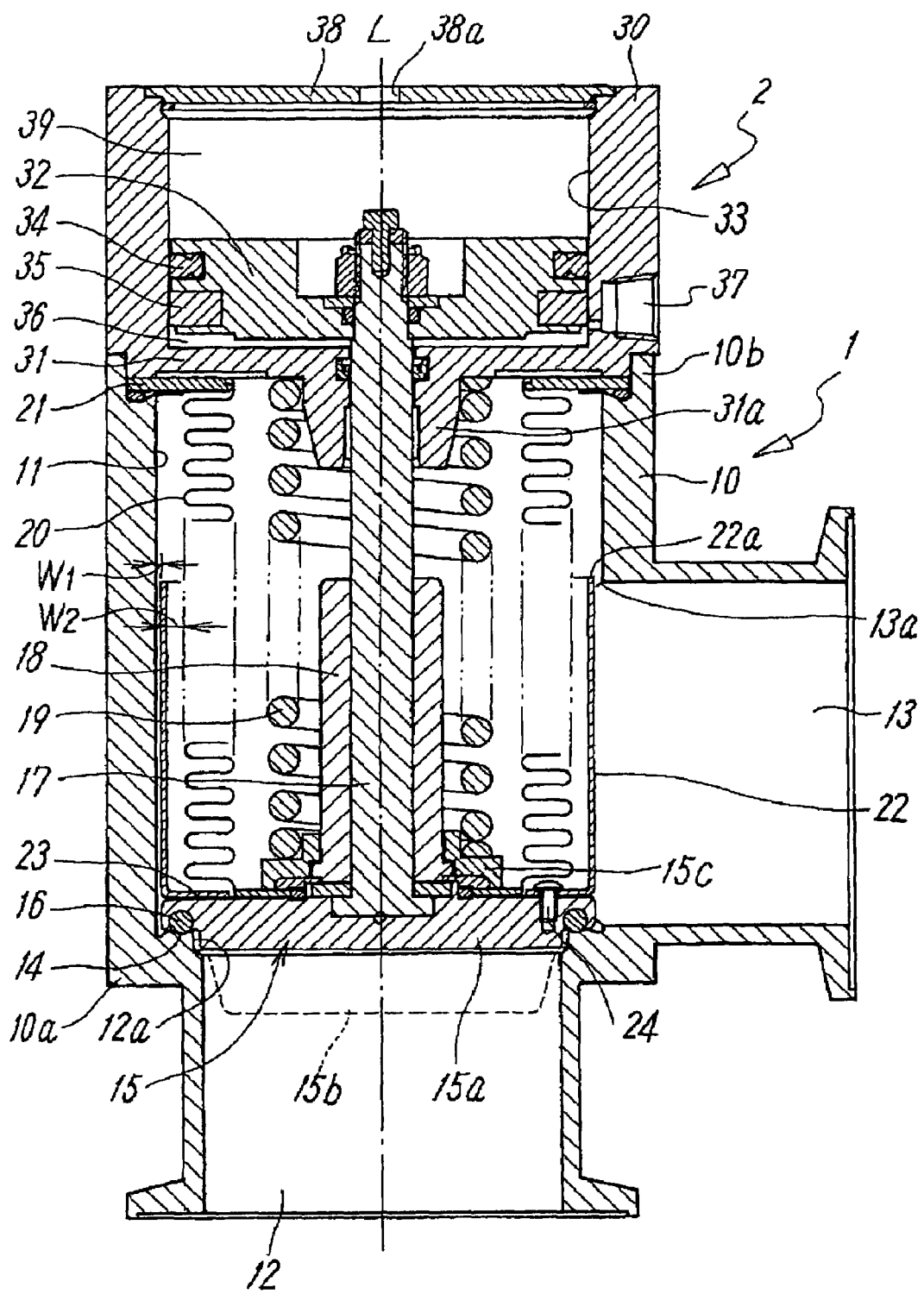
FIG. 1 is a longitudinal sectional view of a vacuum regulating valve in a preferred embodiment according to the present invention in a closed state.
Figure 2:
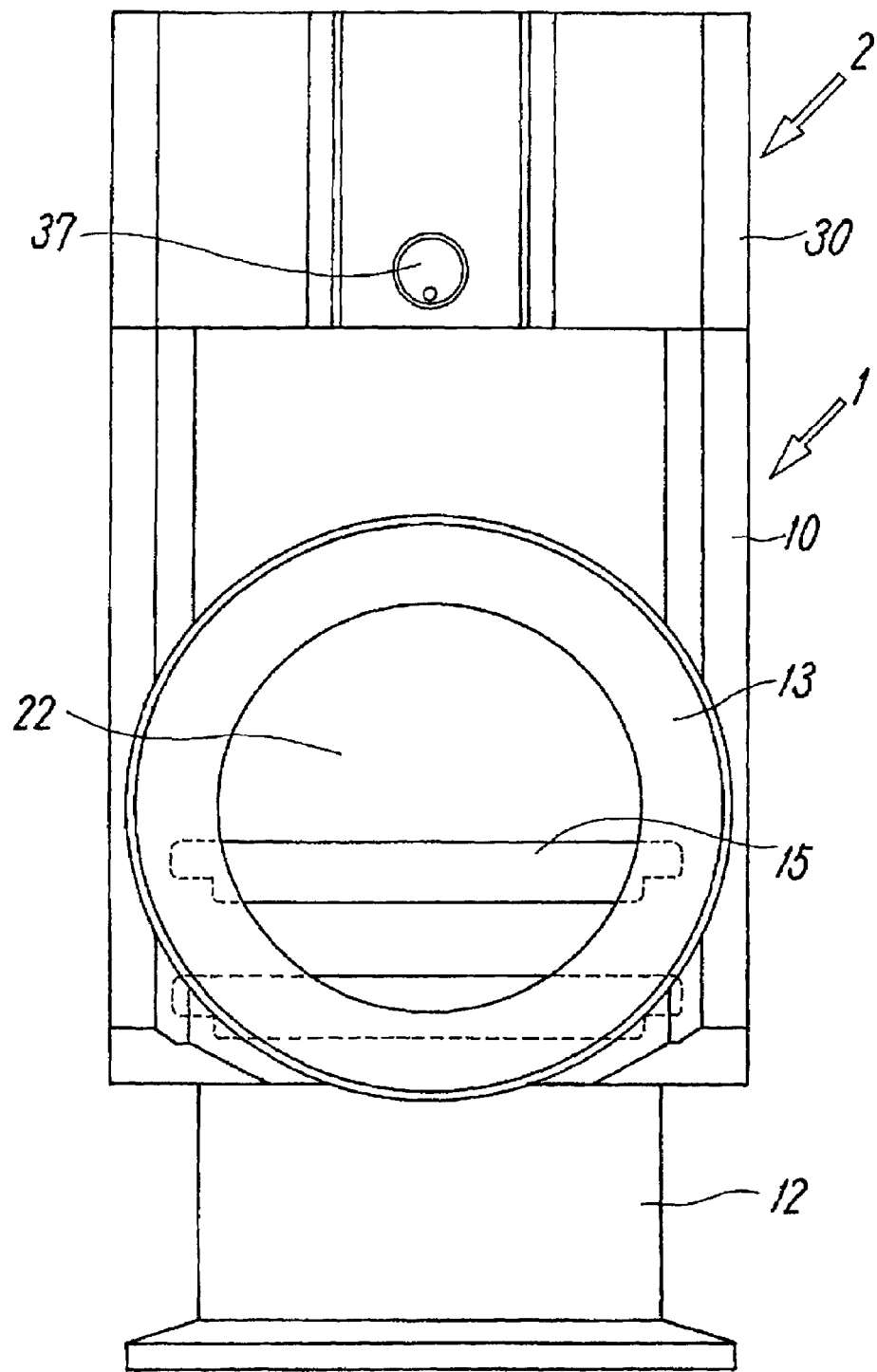
FIG. 2 is a side elevation of the vacuum regulating valve shown in FIG. 1 in an open state and in a closed state.
Figure 3:
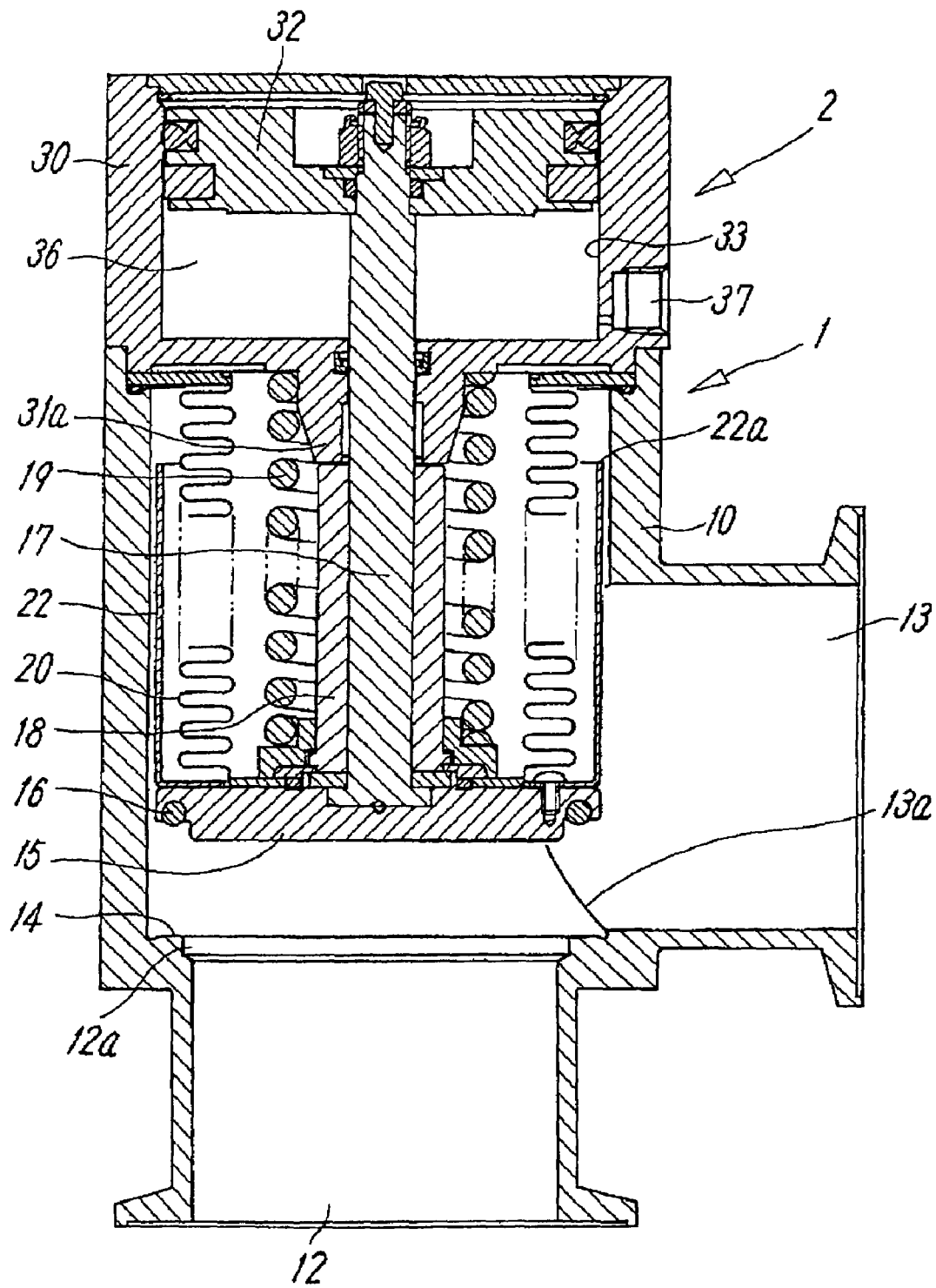
FIG. 3 is a longitudinal sectional view of the vacuum regulating valve shown in FIG. 1 in a closed state.

Referring to. FIGS. 1 to 3 showing a vacuum regulating valve in a preferred embodiment according to the present invention, the vacuum regulating valve has a valve unit 1 including a valve element 15 for opening and closing a passage, and a valve operating unit 2 for operating the valve element 15 to open and close the valve unit 1.

The valve unit 1 has a valve casing 10 of a shape substantially resembling a circular cylinder or a quadrangular prism. The valve casing 10 has a cylindrical valve chamber 11 having an axis L, a first port 12, to be connected to a vacuum vessel, coaxial with the valve chamber 11 and formed in a first end 10a of the valve casing 10, and a second port 13, to be connected to a vacuum pump, formed in the side wall of the valve casing 10 and having an axis perpendicular to the axis L of the valve chamber 11, and is provided with a valve seat 14 disposed in a passage extending between the ports 12 and 13. The valve chamber 11 has a fixed diameter, and the side wall of the valve casing 10 has a smooth, cylindrical inner surface. The first port 12 communicates with the valve chamber 11 by means of a circular first opening 12a formed by enlarging a base part of the first port 12. The second port 13 communicates with the valve chamber 11 by means of a circular second opening 13a formed in abase part of the second port 13. The valve seat 14 surrounds the first opening 12a.

The poppet-type valve element 15 to be seated on and lifted up from the valve seat 14 is held coaxially with the valve seat 14 in the valve casing 10. The valve element 15 is generally disk-shaped. A rubber sealing member 16 having the shape of a ring is put on a reduced front part 15a of the valve element 15. The sealing member 16 is held between the valve seat 14 and the valve element 15 when the valve element 15 is seated on the valve seat 14. The reduced front part 15a is fitted in the first opening 12a of the first port 12 to enhance the controllability of the flow rate of the fluid in an initial stage of a valve opening operation in which the valve element 15 is opened slightly.

The reduced front part 15a may be provided with a tapered nose 15b tapering toward its front end as indicated by broken lines in FIG. 1. The tapered nose 15b increases the opening of the vacuum regulating valve gradually in an initial stage of the valve opening operation to facilitate the control of the flow rate of the fluid in the initial stage of the valve opening operation.

A valve stem 17 is extended coaxially with the axis L through the valve casing 10. The valve stem 17 has a first end part attached to a central part of the back surface of the valve element 15, and a second end part extended through a partition wall 31 separating the valve unit 1 and the valve operating unit 2 into the valve operating unit 2 and connected to a piston 32.

A cylindrical stopper 18 is put on the first end part of the valve stem 17 to define a position of the valve element 15 for a maximum opening. The stopper 18 having a fixed length and extends longitudinally from the back surface of the valve element 15. When the valve element 15 is lifted to the position for the maximum opening, the free end of the stopper 18 comes into contact with a stopping part 31a of the partition wall 31. A compression coil spring serving as a return spring 19 is extended between a spring seat 15c placed on the back surface of the valve element 15 and the inner surface of the partition wall 31 to press the valve element 15 in a closing direction.

An extendable bellows 20 is disposed behind the valve element 15 in the valve chamber 11. The valve stem 17, the stopper 18 and the return spring 19 are sealed hermetically in the bellows 11. The bellows 20 is formed of an impermeable material, such as a metal. The bellows 20 has one end attached to the back surface of the valve element 15 and the other end attached to a support plate 21 held between one end of the valve casing 10 and the partition wall 31. The bellows extends and contracts according to the movement of the valve element 15.

Figure 4:
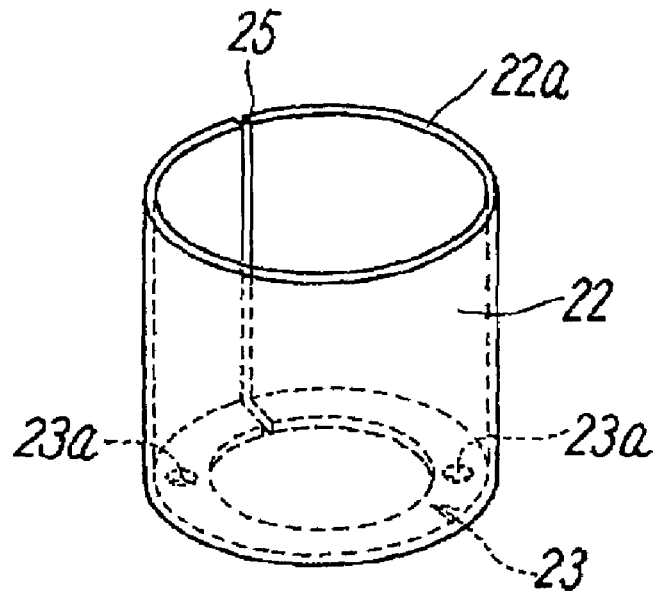
FIG. 4 is a perspective view of a baffle member.

A cylindrical baffle member 22 is disposed behind the valve element 15 so as to surround the bellows 20. The baffle member 22 moves together with the valve element 15 when the valve element is moved for opening and closing operations. As shown in FIG. 4, the baffle member 22 is formed by rolling a corrosion-resistant metal sheet, such as a stainless steel sheet in a cylindrical shape. The baffle member 22 has a base part having an annular end wall 23 extending radially inward and provided with a plurality of openings 23a. Screws 24 are passed through the openings 23a and are screwed in threaded holes formed in the valve element 15 to fasten the baffle member 22 to the back surface of the valve element 15. The baffle member 22 has an open free end 22a. The baffle member 22 has a side wall provided with an axial slit 25. The slit 25 is not essential and may be omitted.

The baffle member 22 is formed in a substantially fixed diameter and in an axial length such that the baffle member 22 is able to cover the second opening 13a entirely when the valve element 15 is seated on the valve seat 16. The baffle member 22 is extended close to the inner surface of the side wall of the valve casing 10 defining the valve chamber 11 so that an outside space of the smallest possible thickness W1 is formed between the baffle member 22 and the side wall of the valve casing 10. The thickness W1 is great enough to keep the baffle member spaced from the inner circumference of the side wall of the valve casing and is small enough to prevent a fluid from flowing through the outside space into an inside space formed between the baffle member 22 and an imaginary cylinder circumscribed about the bellows 20.

Although the diameter of the valve element 15 does not need necessarily to be equal to the outside diameter of the baffle member 22 and may be slightly smaller than the outside diameter of the baffle member 22, it is desirable that the diameter of the valve element 15 is equal to the outside diameter of the baffle member 22. When the diameter of the valve element 15 is equal to the outside diameter of the baffle member 22, the thickness of a gap between the circumference of the valve element 15 and the inner circumference of the side wall of the valve casing 10 is equal to the thickness W1. Consequently, the flow of the fluid into the inside space around the bellows 20 can be more effectively prevented by the combined effect of the valve element 15 and the baffle member 22.

The thickness W2 of the inside space extending between the baffle member 22 and the bellows 20 is greater than the thickness W1. Therefore, the bellows 20 will not come into contact with the baffle member 22 even if the bellows 20 vibrates slightly when the same extends and contracts according to the movement of the valve element 15.

The valve operating unit 2 is a cylinder actuator. The valve operating unit 2 has a cylinder 30 coaxially joined to a second end 10b of the valve casing 10. The cylinder 30 has a shape similar to that of the valve casing 10 substantially resembling a circular cylinder or a quadrangular prism, has the partition wall 31 at one axial end thereof and defines a cylinder bore 33. The piston 32 is fitted slidably in the cylinder bore 33 of the cylinder 30. A sealing ring 34 and a wear ring 35 are fitted in annular grooves formed in the side wall of the piston 32. The valve stem 17 penetrates the partition wall 31 axially slidably and the second end part of the valve stem 17 is connected to the piston 32.

A pressure chamber 36 is formed between the front surface of the piston 32 and the partition wall 31. The pressure chamber 36 connects with a pilot port 37 formed in the cylinder 30. A breathing chamber 39 is formed between the back surface of the piston 32 and a lid 38 attached to the cylinder 30. The breather chamber 39 opens into the atmosphere through a breather hole 39a formed in either the lid 37 or the cylinder 30.

When a pilot fluid is discharged from the pressure chamber 36 as shown in FIG. 1, the valve element 15 is advanced by the resilience of the return spring 19, and the valve element 15 and the sealing member 16 are seated on the valve seat 14. Consequently, the vacuum vessel connected to the first port 12 is disconnected from the vacuum pump connected to the second port 13.

When the pilot fluid of a necessary pressure is supplied through the pilot port 37 into the pressure chamber 36 as shown in FIG. 3, the piston 32 is moved backward and the valve stem 17 pulls back the valve element 15. Consequently, the valve element 15 and the sealing member 16 are separated from the valve seat 14 to open the first main port 12. The movement of the valve element 15 away from the valve seat 14 is stopped upon the contact of the stopper 18 with the stopping part 31a of the partition wall 31.

Figure 5:
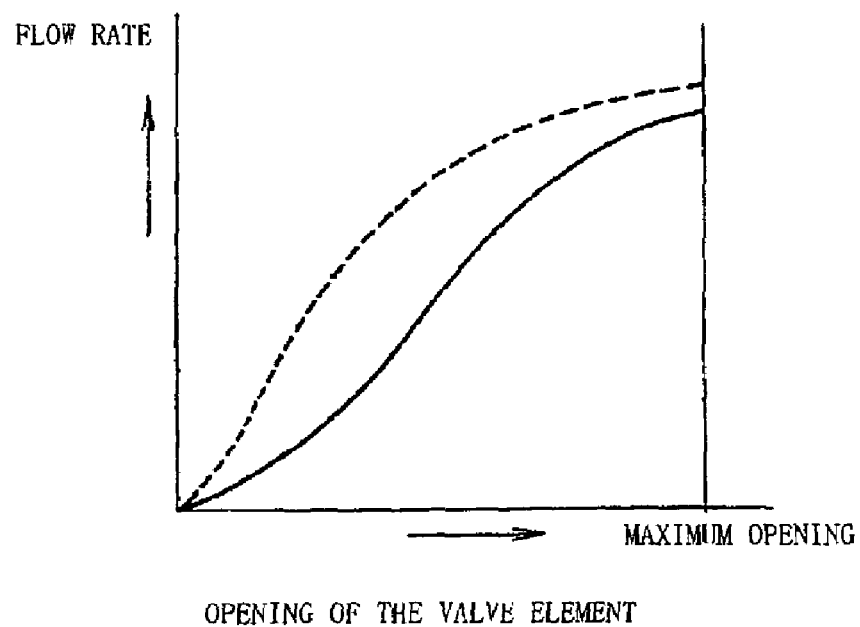
FIG. 5 is a graph comparatively showing the respective characteristics of a vacuum regulating valve according to the present invention and a prior art vacuum regulating valve.

When the vacuum vessel is evacuated through the vacuum regulating valve, the piston 32 is driven to lift up the valve element 15 by the valve stem 17 from the valve seat 14 to open the first port 12. Consequently, a fluid, such as air, flows from the vacuum vessel through the first port 12 and the first opening 12a defined by the valve seat 14 into the valve chamber 11, and flows from the valve chamber 11 through the second port 13 toward the vacuum pump. The flow rate of the fluid increases with the increase of the opening of the first opening 12a in a discharge characteristic indicated by a continuous line in FIG. 5. As obvious from FIG. 5, the flow rate of the fluid flowing through the vacuum regulating valve of the present invention indicated by a continuous line increases more slowly than that of the fluid flowing through the prior art vacuum regulating valve not provided with any member corresponding to the baffle member 22 indicated by a broken line in the initial stage of the valve opening operation.

It is inferred that the cylindrical baffle member 22 attached to the back surface of the valve element 15 so as to extend close to the inner circumference of the side wall of the valve casing 10 and to surround the bellows 20 retards the increase of the flow rate in the initial stage of the valve opening operation by preventing the flow of the fluid flowed through the first port 12 and the first opening 12a into the valve chamber 11 from flowing at a high flow rate into the inside space around the bellows 20. Since the flow rate of the fluid increases slowly, the flow rate can be precisely controlled. Since the baffle member 22 prevents the fluid from flowing into the inside space around the bellows 20, the flow of the fluid from the first port 12 toward the second port 13 is stabilized and the fluid flows scarcely in a turbulent flow. Thus the baffle member 22 has some current straightening function.

Since the flow of the fluid into the inside space around the bellows 20 is prevented, the deterioration of the bellows 20 due to the adhesion of reaction products produced in the vacuum vessel even if the reaction products are sucked into the valve chamber 11.

The bellows 20 extends and contracts according to the movement of the valve element 15 and the bellows 20 sometimes vibrates. However, the vibration of the bellows 20 will not be intensified by the flow of the fluid because the flow of the fluid is straightened by the baffle member 22. Therefore, even if the bellows 20 vibrates, amplitudes of vibrations of the bellows 20 are very small. Since the thickness W2 of the inside space between the baffle member 22 and the bellows 20 is greater than the thickness W1 of the outside space around the baffle member 22, the bellows 20 will not come into contact with the inner circumference of the baffle member 22, will not be abraded and will not produce undesired particles even if the bellows 20 vibrates.

The first port 12 may be connected to the vacuum pump and the second port 13 may be connected to the vacuum vessel instead of connecting the first port 12 to the vacuum vessel and connecting the second port 13 to the vacuum pump. Although the valve operating unit 2 of the vacuum regulating valve of the present invention described above uses a hydraulic cylinder for moving the valve element 15 connected to the valve stem 17, the valve operating unit 2 may use an electric motor for the same purpose.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A vacuum regulating valve comprising:
   a valve casing having a cylindrical valve chamber extending along an axis, and provided with a first port having an axis parallel to the axis of the valve chamber and a first open end opening into the valve chamber, and a second port having an axis perpendicular to the axis of the valve chamber and a second open end opening into the valve chamber;
   a valve seat defining the first open end;
   a disk-shaped valve element capable of being seated on the valve seat to give a tight closure on the valve seat;
   a valve stem extending from a back part of the valve element coaxially with the valve chamber;
   a valve operating unit for operating the valve element through the valve stem for opening and closing operations;
   an extendable bellows disposed in the valve chamber so as to surround the valve stem in an airtight fashion; and
   a cylindrical baffle member disposed behind the valve element so as to surround the bellows and capable of moving together with the valve element;
   wherein the baffle member has a base part attached to the valve element and an open free end, and is formed in an axial length such that the baffle member is able to cover the second open end entirely when the valve element is seated on the valve seat; outside diameter of the baffle member is determined such that an outside space of the smallest possible thickness is defined between an outer circumference of the baffle member and an inner circumference of a side wall of the valve casing, the thickness of the outside space is great enough to keep the baffle member spaced from the inner circumference of the side wall of the valve casing and is small enough to prevent a fluid from flowing through the outside space into an inside space formed between the baffle member and an imaginary cylinder circumscribed about the bellows; and the inside space has a thickness greater than that of the outside space.

2. The vacuum regulating valve according to claim 1, wherein the first port is connected to a vacuum vessel, and the second port is connected to a vacuum pump.

3. The vacuum regulating valve according to claim 1, wherein a base part of the baffle member has an annular bottom wall, and the bottom wall is fastened to a back surface of the valve element to attach the baffle member to the valve element.

4. The vacuum regulating valve according to claim 1, wherein the disk-shaped valve element has a diameter substantially equal to an outside diameter of the baffle member.

5. A vacuum regulating valve according to claim 1, wherein the baffle member is provided in its side wall with an axial slit.

* * * * *